(12) United States Patent
Reid et al.

(10) Patent No.: US 12,040,950 B1
(45) Date of Patent: Jul. 16, 2024

(54) DETECTING A TOPOLOGY IN A DATA CENTER

(71) Applicant: International Business Machines Corporation, Armonk, NY (US)

(72) Inventors: Eric Reid, Pougkeepsie, NY (US); Anurag Umbarkar, Austin, TX (US); Seth Robert Greenspan, Pleasant Valley, NY (US); Edward C. McCain, Campbell Hall, NY (US)

(73) Assignee: International Business Corporation Machines, Armonk, NY (US)

( * ) Notice: Subject to any disclaimer, the term of this patent is extended or adjusted under 35 U.S.C. 154(b) by 0 days.

(21) Appl. No.: 18/126,469

(22) Filed: Mar. 26, 2023

(51) Int. Cl.
*H04L 12/70* (2013.01)
*H04L 41/12* (2022.01)
*H04L 43/04* (2022.01)

(52) U.S. Cl.
CPC .............. *H04L 41/12* (2013.01); *H04L 43/04* (2013.01)

(58) Field of Classification Search
USPC ......................................................... 709/224
See application file for complete search history.

(56) References Cited

U.S. PATENT DOCUMENTS

| | | | |
|---|---|---|---|
| 8,649,651 B2 | 2/2014 | German et al. | |
| 9,306,624 B1* | 4/2016 | Wolter | H02J 13/00034 |
| 9,454,501 B2 | 9/2016 | Dearing et al. | |
| 9,749,039 B1* | 8/2017 | Chen | H04B 10/073 |
| 9,921,997 B2 | 3/2018 | Kumar et al. | |
| 10,445,283 B2 | 10/2019 | Velez et al. | |
| 11,157,274 B2 | 10/2021 | Roy Paladhi et al. | |
| 2014/0064387 A1* | 3/2014 | Bonicatto | H04B 3/54 375/257 |
| 2015/0137728 A1* | 5/2015 | Wand | G01R 25/00 318/605 |
| 2016/0091685 A1* | 3/2016 | Raza | H04Q 11/0066 398/19 |

(Continued)

OTHER PUBLICATIONS

Anonymously, "Unified System for Data Center Electrical System Topology," ip.com, ip.com No. IPCOM000257964D, Mar. 27, 2019, pp. 1-5.

(Continued)

*Primary Examiner* — El Hadji M Sall
*Assistant Examiner* — Elizabeth Kassa
(74) *Attorney, Agent, or Firm* — Shackelford, McKinley & Norton, LLP; Robert A. Voigt, Jr.

(57) ABSTRACT

Described are techniques for detecting a topology in a data center. A measurement computing device is instructed to measure the output signal from an endpoint device attached to a connector portion of the computer cable used to connect a newly installed hardware device. Such a measurement value is compared with other measurement values that were previously obtained by a technician when the technician measured the output signal from various endpoint devices based on the same input signal prior to the installation of the hardware device. The measurement values that were obtained by the technician are correlated to the identifiers of the connectors of the computer cables in the data center. Upon identifying a matching measurement value, the connector of the computer cable connected to the newly installed hardware device is identified, including the location of the newly installed hardware device.

20 Claims, 7 Drawing Sheets

(56) References Cited

U.S. PATENT DOCUMENTS

| | | | |
|---|---|---|---|
| 2017/0063663 A1* | 3/2017 | Shirakawa | H04L 43/50 |
| 2019/0349426 A1* | 11/2019 | Smith | H04L 67/12 |
| 2021/0166824 A1* | 6/2021 | Sugaya | H04W 4/38 |
| 2021/0226870 A1* | 7/2021 | Giorcelli | H04L 43/20 |
| 2021/0232154 A1* | 7/2021 | Kewitsch | G02B 6/3895 |
| 2023/0004292 A1* | 1/2023 | Hu | G06F 3/0653 |
| 2023/0072811 A1* | 3/2023 | Guo | H03F 1/0211 |
| 2023/0074229 A1* | 3/2023 | Jia | G06F 15/7821 |
| 2023/0269217 A1* | 8/2023 | Mestery | H04L 61/4511 |
| | | | 709/238 |
| 2023/0305046 A1* | 9/2023 | Yang | G01R 35/005 |
| 2023/0319367 A1* | 10/2023 | Cook | H04N 21/24 |

OTHER PUBLICATIONS

Anonymously, "Network Inventory Reconciliation via an Augmented Reality-Based Mobile Application," ip.com, ip.com No. IPCOM000265507D, Apr. 20, 2021, pp. 1-15.

Anonymously, "Method and Apparatus for Validating and Visualizing the Network Wiring Inside Racks in Data Center," ip.com, ip.com No. IPCOM000267517D, Nov. 1, 2021, pp. 1-4.

Heather Weatherspoon, "Data Center Network Topologies: Fat-Tree," Sep. 22, 2014, pp. 1-29.

Bob Hansen, "Extending SAS Connectivity in the Data Center," Storage Developer Conference, Santa Clara, California, 2013, pp. 1-24.

Commscope, "Data Center Topology Guide," 2011, pp. 1-6.

* cited by examiner

DETECTING A TOPOLOGY IN A DATA CENTER

TECHNICAL FIELD

The present disclosure relates generally to a data center, and more particularly to detecting a topology in a data center.

BACKGROUND

A data center may be a building, a dedicated space within a building, or a group of buildings used to house computer systems and associated components, such as telecommunications and storage systems. The core components of a data center may include routers, switches, firewalls, storage systems, servers and application delivery controllers. Together, they provide network infrastructure (connects servers (physical and virtualized), data center services, storage and external connectivity to end-user locations), storage infrastructure (used to hold data) and computing resources (provide the processing, memory, local storage and network connectivity that drive applications).

SUMMARY

In one embodiment of the present disclosure, a computer-implemented method for detecting a topology in a data center comprises instructing a measurement computing device to transmit an input signal to an endpoint device of a plurality of endpoint devices located in the data center, where the endpoint device is attached to a connector portion of a computer cable used to connect a newly installed hardware device in the data center. The method further comprises receiving a measurement value of an output signal from the endpoint device based on the input signal. The method additionally comprises comparing the measurement value of the output signal from the endpoint device to other output measurement values of the plurality of endpoint devices to identify the computer cable connected to the newly installed hardware device in the data center based on previous stored correlations between the output measurement values of the plurality of endpoint devices and identifiers of connectors of a plurality of computer cables.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
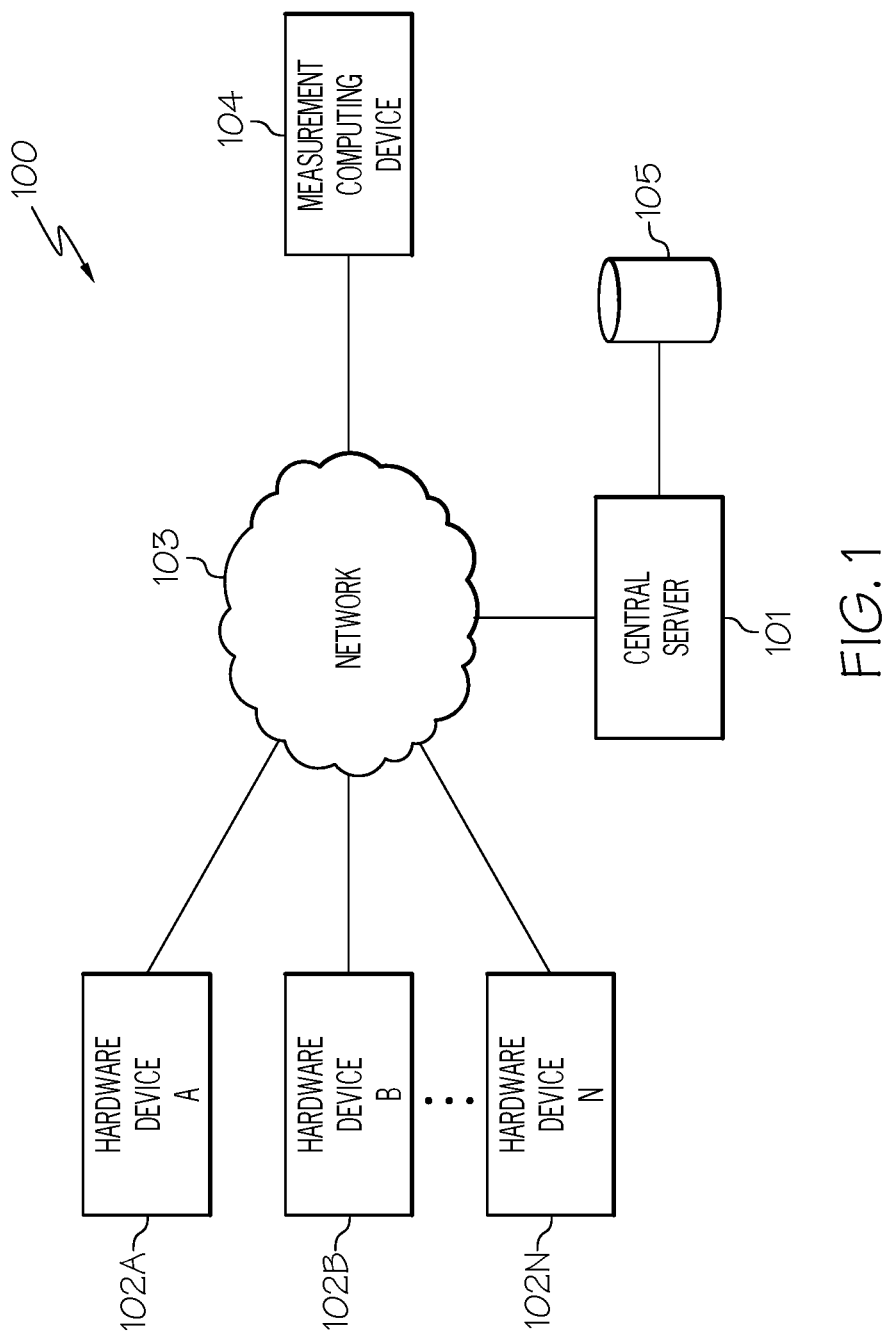
FIG. 1 illustrates a data center for practicing the principles of the present disclosure in accordance with an embodiment of the present disclosure.

As stated above, a data center may be a building, a dedicated space within a building, or a group of buildings used to house computer systems and associated components, such as telecommunications and storage systems. The core components of a data center may include routers, switches, firewalls, storage systems, servers and application delivery controllers. Together, they provide network infrastructure (connects servers (physical and virtualized), data center services, storage and external connectivity to end-user locations), storage infrastructure (used to hold data) and computing resources (provide the processing, memory, local storage and network connectivity that drive applications).

Data centers are designed to support business applications and activities that include email. file sharing, productivity applications, customer relationship management (CRM), enterprise resource planning (ERP), databases, big data, artificial intelligence, machine learning, virtual desktops, communications, collaboration services, etc.

Data center components require significant infrastructure to support the data center's hardware and software. These include power subsystems, uninterruptible power supplies (UPS), ventilation, cooling systems, fire suppression, backup generators, and connections to external networks.

Typically, data centers include thousands of connections that change quickly over time with new hardware being installed in such data centers. Teams responsible for managing this hardware may have difficultly in keeping track of the topology in the data center, including the cables being used to connect such hardware.

Current solutions in assisting such teams to keep track of the topology in the data center, including the cables being used to connect such hardware, have been very expensive at scale. For example, such solutions may employ complex components (e.g., sensors) and algorithms to keep track of the topology in the data center.

As a result, there is not currently a means for effectively detecting a topology in the data center in a cost-effective manner.

The embodiments of the present disclosure provide a means for detecting a topology in a data center based on correlating the measurements of an output signal from endpoint devices with identifiers (e.g., serial numbers) of the connectors of the computer cables. In one embodiment, a technician using a handheld computing device transmits an input signal (e.g., square wave signal) to the endpoint devices mechanically clipped to existing computer cables.

An "endpoint device," as used herein, refers to a device that is attached to a connector portion of a computer cable and is in contact with a portion of a computer port of the hardware device (e.g., switch) when the connector is inserted into the computer port. Since each endpoint device has a different resistor-capacitor configuration which affects the input signal uniquely, each endpoint device outputs an output signal with a different measurement value. Such output measurement values from the endpoint devices are then mapped to identifiers (e.g., serial numbers) of the connectors of the computer cables that are used to connect the hardware devices in the data center. Such mappings or correlations are then stored, such as in a database connected to the central server. A "central server" of the data center, as used herein, is a server responsible for providing shared access to applications and data of the data center. When a new hardware device is installed in the data center, the central server instructs a measurement computing device to transmit an input signal (e.g., square wave signal) to the endpoint device attached to the connector portion of the computer cable connected to the newly installed hardware device (e.g., switch). A "measurement computing device" is a computing device configured to measure output signals from the endpoint devices. Upon receiving a measurement value of the output signal from the endpoint device, such a measurement value is compared with the stored output measurement values of the endpoint devices to identify a matching output measurement value. Upon matching an output measurement value, the connector of the computer cable used to connect the newly installed hardware is identified based on the identifier (e.g., serial number) of the connector of the computer cable correlated with the matched output measurement value. Furthermore, since the location of the computer cable is known, the location of the newly installed hardware device is also known. The topology in the data center is updated accordingly. A further discussion regarding these and other features is provided below.

In some embodiments of the present disclosure, the present disclosure comprises a computer-implemented method, system and computer program product for detecting a topology in a data center. In one embodiment of the present disclosure, a central server in a data center instructs a measurement computing device to transmit an input signal (e.g., square wave signal) to an endpoint device mechanically clipped to a computer cable. An "endpoint device," as used herein, refers to a device that is attached to a connector portion of a computer cable and is in contact with a portion of a computer port of the hardware device (e.g., switch) when the connector is inserted into the computer port. Since each endpoint device has a different resistor-capacitor configuration which affects the input signal uniquely, each endpoint device outputs an output signal with a different measurement value. A "central server" of the data center, as used herein, is a server responsible for providing shared access to applications and data of the data center. A "measurement computing device" is a computing device configured to measure output signals from the connected endpoint devices. The measurement computing device provides the central server the measurement value of the output signal (e.g., output voltage signal) from the endpoint device based on the input signal. The central server then compares the measurement value of the output signal with other measurement values that were previously obtained by a technician when the technician measured the output signal from various endpoint devices based on the same input signal (e.g., square wave signal). The measurement values that were obtained by the technician are mapped or correlated to identifiers (e.g., serial numbers) of the connectors of the computer cables that are used to connect hardware devices in the data center. That is, such output measurement values from the endpoint devices are mapped or correlated to identifiers of the connectors of computer cables plugged into the hardware devices. As a result, upon the central server identifying a measurement value out of the measurement values obtained by the technician, the central server is able to identify the connector of the computer cable connected to the newly installed hardware device. Furthermore, since the location of the computer cable is known, the location of the newly installed hardware device is also known. The topology is then updated by the central server accordingly based on the identified computer cable. In this manner, the topology in a data center is detected without employing complex components (e.g., sensors) and algorithms.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a data center 100 for practicing the principles of the present disclosure. Data center 100 includes a central server 101 configured to provide shared access to applications and data of the data center.

Furthermore, as shown in FIG. 1, central server 101 is connected to devices 102A-102N (identified as "Hardware Device A," "Hardware Device B," . . . "Hardware Device N," respectively, in FIG. 1), where N is a positive integer number, via a network 103. Hardware devices 102A-102N may collectively or individually be referred to as hardware devices 102 or hardware device 102, respectively. Hardware device 102, as used herein, refers to the hardware of data center 100, such as routers, switches, firewalls, storage systems, servers, etc.

Additionally, as shown in FIG. 1, a measurement computing device 104 is connected to central server 101 via network 103 as well as directly connected to endpoint devices as discussed below in connection with FIGS. 2-3. A "measurement computing device 104," as used herein, is a computing device configured to measure output signals from connected endpoint devices. An "endpoint device," as used herein, refers to a device that is attached to a connector portion of a computer cable and is in contact with a portion of a computer port of hardware device 102 (e.g., server) when the connector is inserted into the computer port.

In one embodiment, network 103 is a large storage area network. Other networks, whose descriptions are omitted here for brevity, may also be used in conjunction with data center 100 of FIG. 1 without departing from the scope of the present disclosure.

In one embodiment, central server 101 is configured to detect a topology in data center 100. In one embodiment, a technician using a handheld electronic test equipment transmits an input signal (e.g., square wave signal) to the endpoint devices attached to the connector portion of computer cables and measures the output signal (e.g., output voltage signal). In one embodiment, the output signal corresponds to a voltage signal, which is measured from the endpoint device based on the input signal over multiple cycles. In one embodiment, such a handheld electronic test equipment utilizes a function generator to generate and deliver standard waveforms, such as square waves to the endpoint devices. Examples of such a handheld electronic test equipment include, but not limited to, Fluke® 725 US, MTI Instruments® 1510A, Atten® AT-H501, Owon® HDS1021M, etc.

In one embodiment, each endpoint device has a different resistor-capacitor configuration which affects the input signal uniquely. As a result, each endpoint device outputs an output signal (e.g., voltage output signal) with a different measurement value. Such unique output measurement values may then be mapped to identifiers (e.g., serial numbers) of the connectors of the computer cables that are used to connect hardware devices 102 in data center 100. Furthermore, in one embodiment, such mappings include the locations of the computer cables. In one embodiment, such mappings or correlations are stored in a data structure (e.g., table). In one embodiment, such a data structure is populated with the correlations discussed above by the technician. In one embodiment, such a data structure is stored in a database 105 connected to central server 101.

Upon storing such mappings or correlations in database 105, central server 101 is able to identify the connector of the computer cable used to connect a newly installed hardware device 102 in data center 100. Since the location of the computer cable known, the location of the newly installed hardware device 102 is also known. Central server 101 then updates the topology in data center 100 accordingly.

In one embodiment, upon installing a new hardware device 102 in data center 100, central server 101 is configured to instruct measurement computing device 104 to transmit an input signal (e.g., square wave signal) to the endpoint device which is attached to the connector portion of the computer cable (connected to the newly installed hardware device 102) and is in contact with a portion of a computer port of hardware device 102 (e.g., server) when the connector is inserted into the computer port. In order to determine which computer cable is connected to the newly installed hardware device 102, measurement computing device 104 measures the output signal (e.g., output voltage signal) of the endpoint device. As previously discussed, each endpoint device has a different resistor-capacitor configuration which affects the input signal uniquely. As a result, each endpoint device outputs an output signal (e.g., voltage output signal) with a different measurement value.

In one embodiment, the obtained measurement value of the output signal of the endpoint device attached to the computer cable connected to the newly installed hardware device 102 is provided to central server 101 in order to compare such a measurement value with the other measurement values of the endpoint devices, such as those measurement values of the endpoint devices that are stored in database 105. As discussed above, in one embodiment, database 105 stores a data structure (e.g., table) consisting of mappings or correlations between output measurement values of the endpoint devices (based on the same input signal) and identifiers (e.g., serial numbers) of the connectors of the computer cables that are used to connect hardware devices 102 in data center 100 upon installation. Upon identifying a matching output measurement value, the matching output measurement value is associated or mapped to an identifier (e.g., serial number) of a connector of a computer cable. Such a mapped computer cable corresponds to the computer cable being utilized for connecting hardware device 102 in data center 100. In this manner, the particular computer cable being utilized for connecting the newly installed hardware device 102 is identified. Furthermore, since the location of the computer cable is known, the location of the newly installed hardware device 102 is also known. Central server 101 then updates the topology in data center 100 accordingly.

A further discussion regarding these and other features of central server 101 and measurement computing device 104 is provided below. In particular, a further description of measurement computing device 104 and its connections to endpoint devices is provided below in connection with FIG. 2. A further description of measuring the output signal from the endpoint devices by measurement computing device 104 is provided below in connection with FIG. 3. A description of the software components of central server 101 used for detecting a topology in data center 100 is provided below in connection with FIG. 4. A description of the hardware configuration of central server 101 is provided further below in connection with FIG. 5.

Data center 100 is not to be limited in scope to any one particular network architecture. Data center 100 may include any number of central servers 101, hardware devices 102, networks 103, measurement computing devices 104 and databases 105.

As previously discussed, a description of measurement computing device 104 and its connections to endpoint devices is provided below in connection with FIG. 2.

Figure 2:
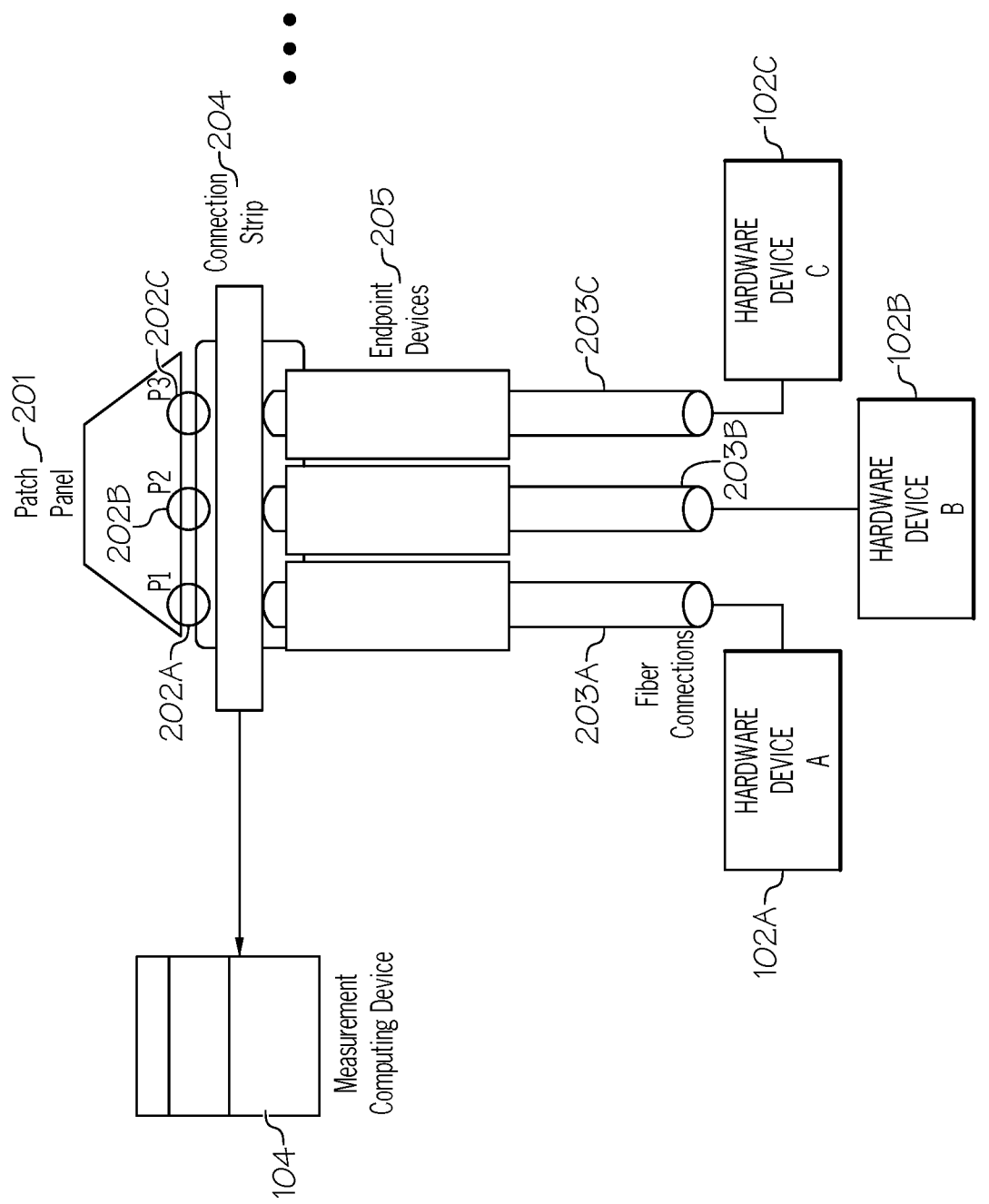
FIG. 2 illustrates the connections between the endpoint devices and the measurement computing device in accordance with an embodiment of the present disclosure.

Referring to FIG. 2, FIG. 2 illustrates the interconnection between measurement computing device 104 and endpoint devices 205 in accordance with an embodiment of the present disclosure.

Prior to the discussion regarding endpoint devices 205, a brief discussion regarding patch panel 201 in data center 100 is deemed appropriate. A "patch panel 201," as used herein, refers to a mounted hardware assembly that contains ports 202A-202C (identified as "P1," "P2," and "P3," respectively, in FIG. 2) that are used to connect and manage incoming and outgoing computer cables, such as fiber connections 203A-203C connected to hardware devices 102 (e.g., hardware devices 102A, 102B and 102C, which are identified as "Hardware Device A, "Hardware Device B," and "Hardware Device C," respectively in FIG. 2). Ports 202A-202C may collectively or individually be referred to as ports 202 or port 202, respectively. Furthermore, fiber connections 203A-203C may collectively or individually be referred to as fiber connections 203 or fiber connection 203, respectively. While FIG. 2 illustrates three ports 202 and three fiber connections 203, the principles of the present disclosure are not limited to such a number of ports 202 and fiber connections 203. Patch panel 201 may contain any number of ports 202 that are used to connect and manage any number of fiber connections 203.

In one embodiment, patch panel 201 provides a way to keep large numbers of computer cables (e.g., fiber connections 203) organized, enabling flexible connectivity into network hardware located in data center 100.

In one embodiment, patch panel 201 contains blank ports on one side and a termination point on the other. Computer cables (e.g., fiber connections 203) running throughout data center 100 can be terminated, labeled and then patched into network hardware, such as hardware devices 102.

In one embodiment, patch panel 201 is configured to accommodate fiber optic cables in data center 100. In one embodiment, patch panel 201 serves as a static switchboard, using computer cables (e.g., fiber connections 203) to interconnect hardware devices 102 within data center 100 and to outside lines, including the Internet or other wide area networks.

In one embodiment, patch panel 201 uses a patch cord to create each interconnection between the terminated patch panel 201 and hardware device 102.

In one embodiment, measurement computing device 104 includes a connection strip 204 (e.g., copper connection strip) that is placed on ports 202. A "connection strip 204," as used herein, refers to a terminal strip that enables the connection of ports 202 and connections 203 thereby connecting hardware devices 102. In one embodiment, such connections are connected to ports 202 via connectors of connections 203. "Connectors," as used herein, refer to the end of a computer cable (e.g., connection 203) that connects to a port, such as port 202.

In one embodiment, endpoint devices 205 are mechanically clipped to existing computer cables (e.g., fiber connections 203) in data center 100. An "endpoint device 205," as used herein, refers to a device that is attached to a connector portion of a computer cable (e.g., fiber connection 203) and is in contact with a portion of a computer port of hardware device 102 (e.g., switch) when the connector is inserted into the computer port. In one embodiment, each endpoint device 205 has a different resistor-capacitor configuration which affects an input signal uniquely. Hence, when measurement computing device 104 provides an input signal (e.g., square wave) to endpoint devices 205, measurement computing device 104 measures a different output signal from each endpoint device 205 as discussed below in connection with FIG. 3.

Figure 3:
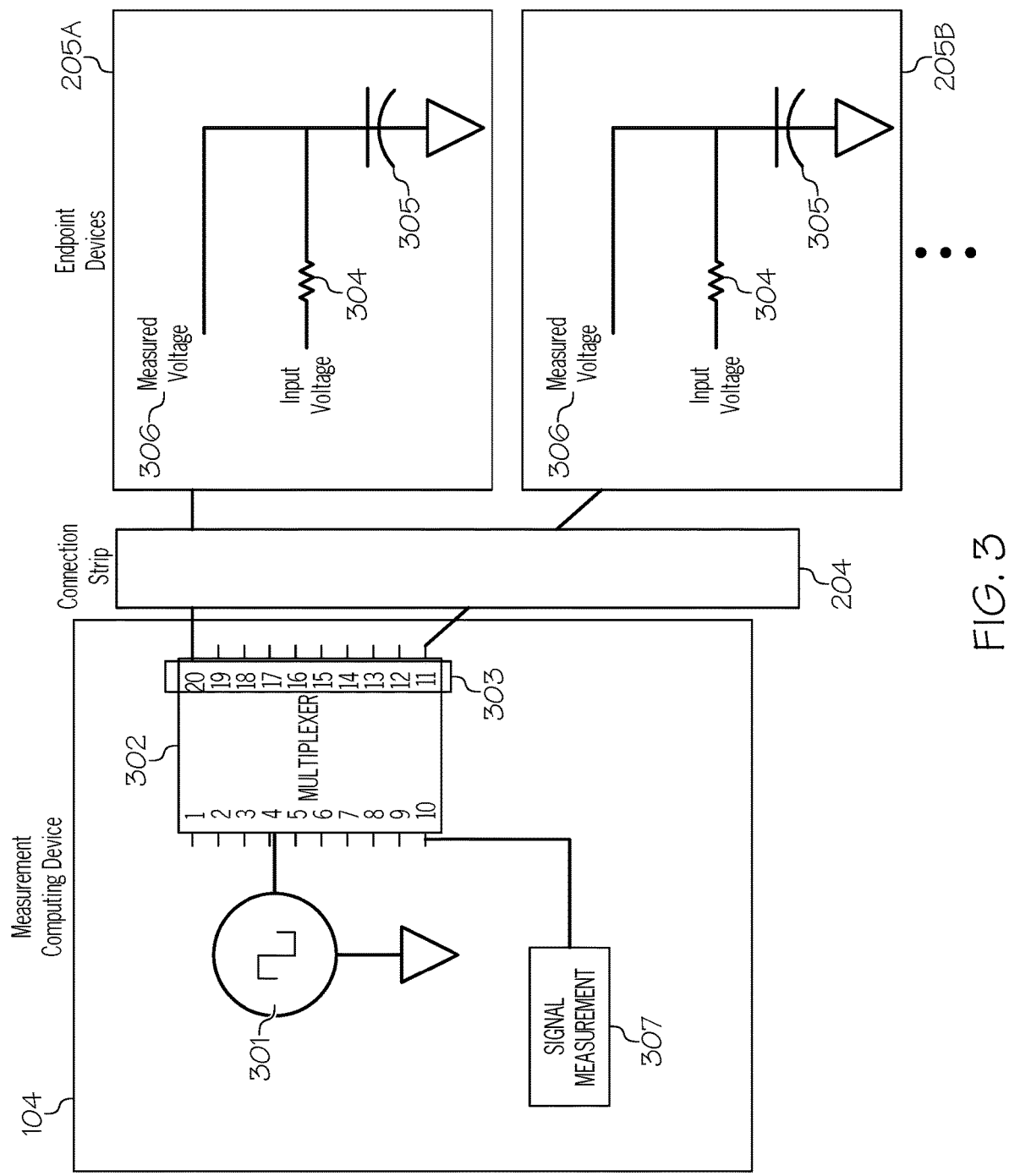
FIG. 3 illustrates the measurement computing device measuring the output signal from the endpoint devices in accordance with an embodiment of the present disclosure.

Referring to FIG. 3, FIG. 3 illustrates measurement computing device 104 measuring the output signal from endpoint devices 205 in accordance with an embodiment of the present disclosure.

As shown in FIG. 3, upon receiving an instruction from central server 101 to transmit an input signal to endpoint devices 205 (e.g., endpoint devices 205A, 205B), measurement computing device 104 proceeds to transmit the input signal to endpoint devices 205 attached to a connector portion of computer cables (e.g., fiber connections 203). In one embodiment, measurement computing device 102 transmits the same input signal (e.g., square wave signal) 301, such as by a function generator, to each endpoint device 205 (e.g., endpoint devices 205A, 205B), such as via multiplexer 302. In one embodiment, multiplexer 302 is utilized to send the input signal to the appropriately connected endpoint device 205 based on outputting the input signal from the appropriate output pin of output pins 303 of multiplexer 302 to specific ports 202 (see FIG. 2) that are connected to specific endpoint devices 205 via connection strip 204.

As previously discussed, each endpoint device 205 has a different resistor-capacitor configuration which affects the input signal uniquely. A "different resistor-capacitor configuration," as used herein, refers to having different values in the resistor-capacitor configuration. For example, as shown in FIG. 3, each endpoint device 205, such as endpoint devices 205A, 205B, has a resistor 304—capacitor 305 configuration. In one embodiment, such a resistor 304—capacitor 305 configuration corresponds to a filter. Since the values of such resistors 304, capacitors 305 differ among endpoint devices 205, each endpoint device 205 has a different resistor 304—capacitor 305 configuration which affects the input signal uniquely. As a result, each endpoint device 205 outputs a different measurement value, such as a different measurement value for the output voltage signal 306, which is measured by measurement computing device 104.

In one embodiment, measurement computing device 104 measures the output signal (e.g., output voltage signal 306) based on the input signal 301 over multiple cycles.

In one embodiment, measurement computing device 104 sends the measurement 307 (measurement value of the measured output signal) to central server 101.

A discussion regarding central server 101 utilizing such a measurement value 307 from endpoint device 205 attached to the connector portion of the computer cable connected to hardware device 102 newly installed in data center 100 in order to identify the computer cable (e.g., fiber connection 203 of FIG. 2) used to connect such newly installed hardware device 102 is provided below in connection with FIG. 4.

Figure 4:
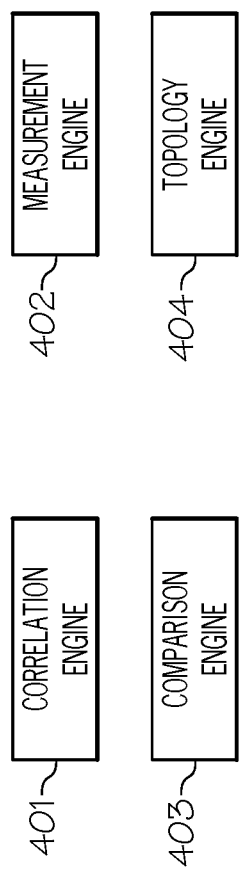
FIG. 4 is a diagram of the software components used by the central server to detect a topology in the data center in accordance with an embodiment of the present disclosure.

FIG. 4 is a diagram of the software components used by central system 101 to detect a topology in data center 100 in accordance with an embodiment of the present disclosure.

Referring to FIG. 4, in conjunction with FIGS. 1-3, central server 101 includes a correlation engine 401 configured to store the received correlations between the output measurement values of the output signals from endpoint devices 205 to the identifiers (e.g., serial numbers) of the connectors of the computer cables (e.g., fiber connections 203) that are attached to such endpoint devices 205. In one embodiment, such correlations are stored in a data structure (e.g., table). In one embodiment, such correlations are received from the technician as discussed above, which are populated in a data structure (e.g., table). In one embodiment, such a data structure is stored in database 105.

Upon storing such mappings or correlations in database 105 and installing a hardware device 102 in data center 100, central server 101 is able to identify the computer cable used to connect the installed hardware device 102 as discussed below.

Furthermore, as shown in FIG. 4, central server 101 includes a measurement engine 402 configured to instruct measurement computing device 104 to transmit an input signal to endpoint device 205 attached to the connector portion of the computer cable (e.g., fiber connection 203) used to connect the newly installed hardware device 102 in data center 100. In one embodiment, such an input signal corresponds to the same input signal which was previously inputted to endpoint devices 205 (prior to installation of hardware device 102) by the technician discussed above. In one embodiment, such an input signal corresponds to a square wave signal.

In one embodiment, such an instruction is in a form of a computer program instructing measurement computing device 104 to transmit an input signal to endpoint device 205 attached to the connector portion of the computer cable (e.g., fiber connection 203) used to connect the newly installed hardware device 102 in data center 100 as discussed above.

In one embodiment, such an instruction is in response to an installation of hardware device 102 in data center 100. In one embodiment, central server 101 receives an indication of the installation of hardware device 102 in data center 100 from the technician that installed hardware device 102 in data center 100. In one embodiment, such an indication is in the form of an electronic message.

Alternatively, in one embodiment, central server 101 utilizes a device discovery tool for detecting newly installed hardware, such as hardware device 102, in data center 100. Examples of such device discovery tools include, but not limited to, SolarWinds® Network Topology Mapper, ManageEngine® OpManager, Intermapper®, Atera®, NetBrain®, etc.

Furthermore, in one embodiment, measurement engine 402 is configured to receive the measurement value of the output signal from endpoint device 205 (endpoint device 205 attached to the connector portion of the computer cable used to connect the newly installed hardware device 102) based on the input signal. In one embodiment, such a measurement value, such as measurement value 307, is received by central server 101 from measurement computing device 104.

Additionally, as shown in FIG. 4, central server 101 includes a comparison engine 403 configured to compare the received measurement value to the other measurement values stored in the data structure (e.g., table) which stores the correlations between the output measurement values of the output signals from endpoint devices 205 to the identifiers (e.g., serial numbers) of the connectors of the computer cables (e.g., fiber connections 203) upon which such endpoint devices 205 are mechanically clipped. In one embodiment, comparison engine 403 utilizes various software tools for comparing the received measurement value to the other measurement values stored in the data structure (e.g., table) which stores the correlations between the output measurement values of the output signals from endpoint devices 205 and the identifiers (e.g., serial numbers) of the connectors of the computer cables (e.g., fiber connections 203) upon which such endpoint devices 205 are mechanically clipped, including, but not limited to, Enlighten Match, Senzing®, LinkageWiz, DataMatch, Egon, Data Ladder®, Matchit®, etc.

In one embodiment, if a matching measurement value is not found in the data structure, then comparison engine 403 generates an indication that a matching measurement value was not found. In one embodiment, such an indication corresponds to an electronic message (e.g., email message, instant message), which may be sent to the user of central server 101.

If a matching measurement value is found in the data structure, then comparison engine 403 identifies the computer cable (e.g., fiber connection 203) that is used to connect the newly installed hardware device 102 based on the identifier (e.g., serial number) of the connector of the computer cable used to connect the newly installed hardware device 102 that is correlated with the matching measurement value as discussed above. Furthermore, since the location of the computer cable is known, the location of the newly installed hardware device 102 is also known. In this manner, the particular computer cable (e.g., fiber connection 203) being utilized for connecting the newly installed hardware device 102 is identified, including its location.

Upon identifying the computer cable (e.g., fiber connection 203) being utilized for connecting the newly installed hardware device 102, including the location of the newly installed hardware device 102, topology engine 404 of central server 101 updates the topology accordingly.

A "topology," as used herein, refers to the physical and logical arrangement of computer cables (e.g., fiber connections 203) and hardware devices (e.g., hardware devices 102) in data center 100. In one embodiment, topology engine 404 utilizes various software tools for updating the topology including, but not limited to, SolarWinds® Network Topology Mapper, Paessler® PRTG® Network Monitor, ManageEngine® OpManager, Nmap®, etc.

A further description of these and other features is provided below in connection with the discussion of the method for detecting a topology in a data center, such as data center 100.

Prior to the discussion of the method for detecting a topology in a data center, a description of the hardware configuration of central server 101 (FIG. 1) is provided below in connection with FIG. 5.

Figure 5:
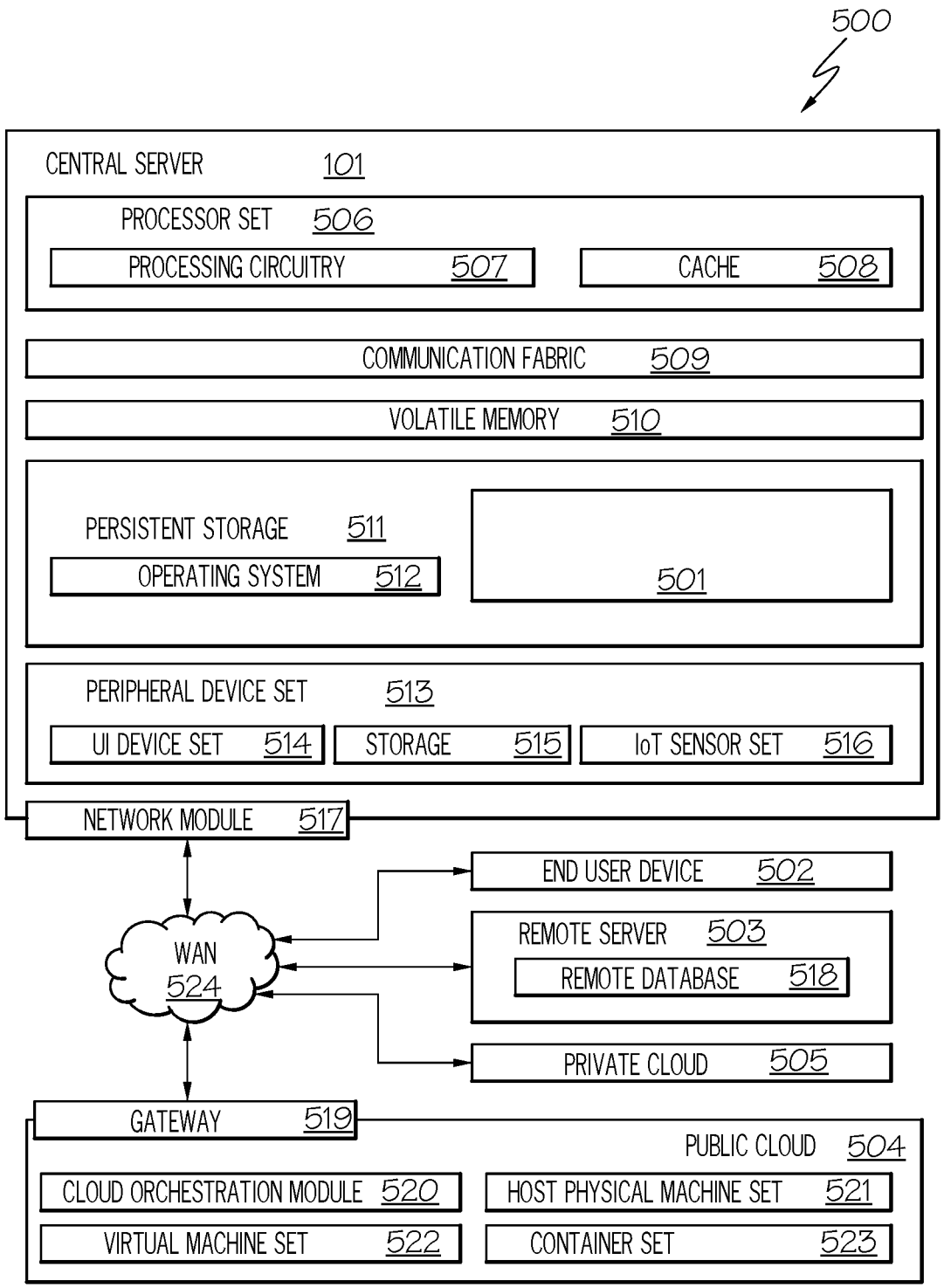
FIG. 5 illustrates an embodiment of the present disclosure of the hardware configuration of the central server which is representative of a hardware environment for practicing the present disclosure.

Referring now to FIG. 5, in conjunction with FIG. 1, FIG. 5 illustrates an embodiment of the present disclosure of the hardware configuration of central server 101 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (computer code for detecting a topology in a data center stored in block 501) involved in performing the disclosed methods, such as detecting a topology in data center 100. In addition to block 501, computing environment 500 includes, for example, central server 101, wide area network (WAN) 524 (in one embodiment, WAN 524 corresponds to network 103), end user device (EUD) 502, remote server 503, public cloud 504, and private cloud 505. In this embodiment, central server 101 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Central server 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically central server 101, to keep the presentation as simple as possible. Central server 101 may be located in a cloud, even though it is not shown in a cloud in FIG. 5. On the other hand, central server 101 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto central server 101 to cause a series of operational steps to be performed by processor set 506 of central server 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 508 and the other storage media discussed below. The program instructions, and associated data, are accessed by processor set 506 to control and direct performance of the disclosed methods. In computing environment 500, at least some of the instructions for performing the disclosed methods may be stored in block 501 in persistent storage 511.

Communication fabric 509 is the signal conduction paths that allow the various components of central server 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In central server 101, the volatile memory 510 is located in a single package and is internal to central server 101, but, alternatively or additionally, the volatile memory may be distributed over multiple packages and/or located externally with respect to central server 101.

Persistent Storage 511 is any form of non-volatile storage for computers that is now known or to be developed in the future. The non-volatility of this storage means that the stored data is maintained regardless of whether power is being supplied to central server 101 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the disclosed methods.

Peripheral device set 513 includes the set of peripheral devices of central server 101. Data communication connections between the peripheral devices and the other components of central server 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where central server 101 is required to have a large amount of storage (for example, where central server 101 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows central server 101 to communicate with other computers through WAN 524. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the disclosed methods can typically be downloaded to central server 101 from an external computer or external storage device through a network adapter card or network interface included in network module 517.

WAN 524 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates central server 101), and may take any of the forms discussed above in connection with central server 101. EUD 502 typically receives helpful and useful data from the operations of central server 101. For example, in a hypothetical case where central server 101 is designed to provide a recommendation to an end user, this recommendation would typically be communicated from network module 517 of central server 101 through WAN 524 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to central server 101. Remote server 503 may be controlled and used by the same entity that operates central server 101. Remote server 503 represents the machine(s) that collect and store helpful and useful data for use by other computers, such as central server 101. For example, in a hypothetical case where central server 101 is designed and programmed to provide a recommendation based on historical data, then this historical data may be provided to central server 101 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 524.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 524 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIG. 4 to detect a topology in a data center, such as data center 100. In one embodiment, such components may be implemented in hardware. The functions discussed above performed by such components are not generic computer functions. As a result, central server 101 is a particular machine that is the result of implementing specific, non-generic computer functions.

In one embodiment, the functionality of such software components of central server 101, including the functionality for detecting a topology in a data center, such as data center 100, may be embodied in an application specific integrated circuit.

As stated above, a data center may be a building, a dedicated space within a building, or a group of buildings used to house computer systems and associated components, such as telecommunications and storage systems. The core components of a data center may include routers, switches, firewalls, storage systems, servers and application delivery controllers. Together, they provide network infrastructure (connects servers (physical and virtualized), data center services, storage and external connectivity to end-user locations), storage infrastructure (used to hold data) and computing resources (provide the processing, memory, local storage and network connectivity that drive applications). Data centers are designed to support business applications and activities that include email, file sharing, productivity applications, customer relationship management (CRM), enterprise resource planning (ERP), databases, big data, artificial intelligence, machine learning, virtual desktops, communications, collaboration services, etc. Data center components require significant infrastructure to support the data center's hardware and software. These include power subsystems, uninterruptible power supplies (UPS), ventilation, cooling systems, fire suppression, backup generators, and connections to external networks. Typically, data centers include thousands of connections that change quickly over time with new hardware being installed in such data centers. Teams responsible for managing this hardware may have difficulty in keeping track of the topology in the data center, including the cables being used to connect such hardware. Current solutions in assisting such teams to keep track of the topology in the data center, including the cables being used to connect such hardware, have been very expensive at scale. For example, such solutions may employ complex components (e.g., sensors) and algorithms to keep track of the topology in the data center. As a result, there is not currently a means for effectively detecting a topology in the data center in a cost-effective manner.

Figure 6:
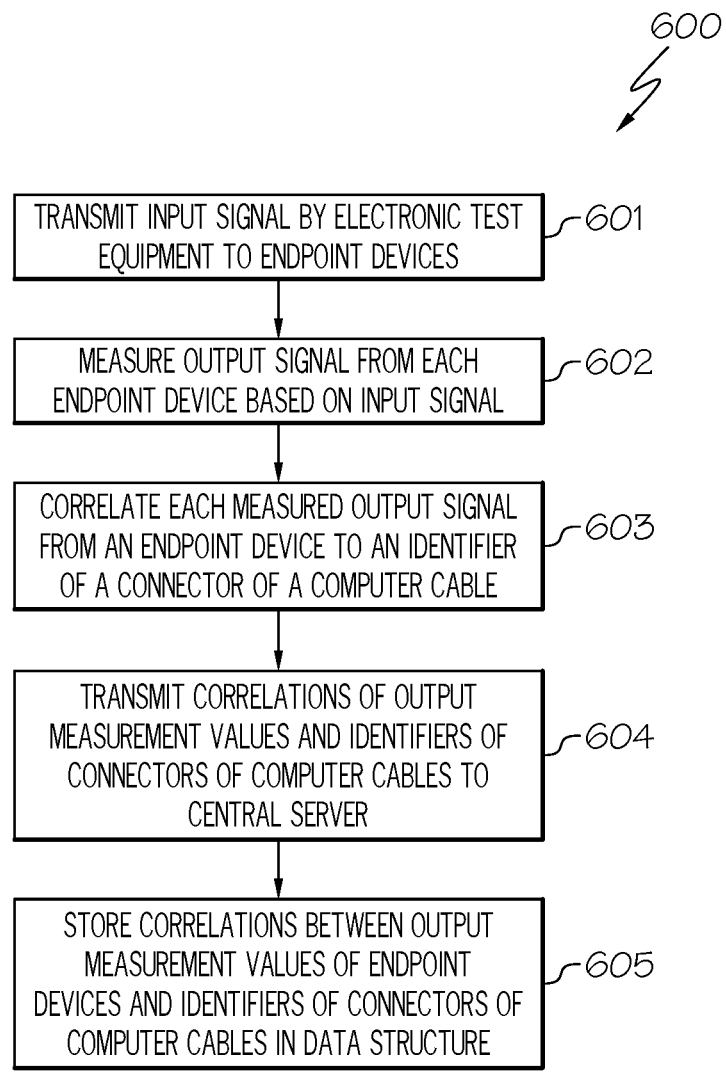
FIG. 6 is a flowchart of a method for determining correlations between the output measurement values of the endpoint devices and identifiers of the connectors of the computer cables in accordance with an embodiment of the present disclosure.
Figure 7:
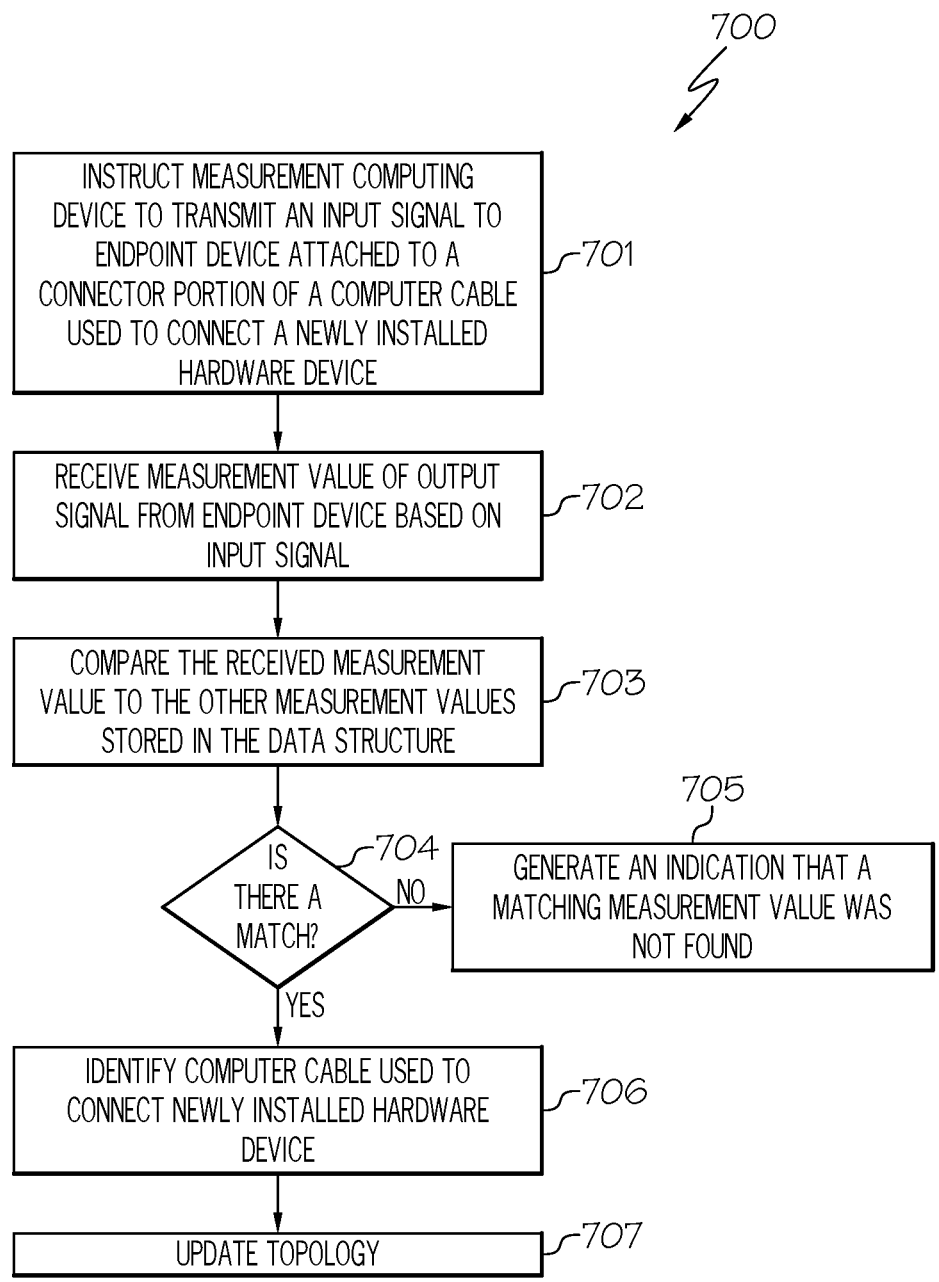
FIG. 7 is a flowchart of a method for detecting a topology in a data center in accordance with an embodiment of the present disclosure.

The embodiments of the present disclosure provide a means for detecting a topology in a data center based on correlating measurement values of an output signal from endpoint devices with identifiers (e.g., serial numbers) of the connectors of the computer cables as discussed below in connection with FIGS. 6-7. FIG. 6 is a flowchart of a method 600 for determining correlations between the output measurement values of the endpoint devices and identifiers of the connectors of the computer cables. FIG. 7 is a flowchart of a method for detecting a topology in a data center, such as data center 100.

As stated above, FIG. 6 is a flowchart of a method 600 for determining correlations between the output measurement values of the endpoint devices and identifiers of the connectors of the computer cables in accordance with an embodiment of the present disclosure.

Referring to FIG. 6, in conjunction with FIGS. 1-5, in operation 601, a technician using a handheld electronic test equipment transmits an input signal (e.g., square wave signal) to endpoint devices 205 attached to the connector portions of the computer cables (e.g., fiber connections) used to connect hardware devices 102 in data center 100. In one embodiment, each endpoint device 205 receives the same input signal.

As discussed above, in one embodiment, such a handheld electronic test equipment utilizes a function generator to generate and deliver standard waveforms, such as square waves to endpoint devices 104. Examples of such a handheld electronic test equipment include, but not limited to, Fluke® 725 US, MTI Instruments® 1510A, Atten® AT-H501, Owon® HDS1021M, etc.

In operation 602, the technician using the handheld electronic test equipment measures the output signal (e.g., output voltage signal) from each endpoint device 205 based on the input signal. In one embodiment, the output signal corresponds to a voltage signal, which is measured from endpoint device 205 based on the input signal over multiple cycles. As discussed above, examples of such a handheld electronic test equipment to perform such a measurement include, but not limited to, Fluke® 725 US, MTI Instruments® 1510A, Atten® AT-H501, Owon® HDS1021M, etc.

In operation 603, the technician correlates each measured output signal from an endpoint device 205 to an identifier (e.g., serial number) of the connector of the computer cable (e.g., fiber connection 203) upon which endpoint device 205 is mechanically clipped.

As discussed above, in one embodiment, each endpoint device 205 has a different resistor-capacitor configuration which affects the input signal uniquely. As a result, each endpoint device 205 outputs an output signal (e.g., voltage output signal) with a different measurement value. Such unique output measurement values may then be mapped to identifiers (e.g., serial numbers) of the connectors of the computer cables upon which endpoint devices 205 are mechanically clipped.

In operation 604, such mappings or correlations (correlations between the output measurement values and the identifiers of the connectors of the computer cables) are transmitted to central server 101 by the technician, such as via the technician's handheld electronic test equipment.

In operation 605, correlation engine 401 of central server 101 stores the received correlations between the output measurement values of the output signals from endpoint devices 205 and the identifiers (e.g., serial numbers) of the connectors of the computer cables (e.g., fiber connections 203) upon which endpoint devices 205 are mechanically clipped.

As discussed above, in one embodiment, such correlations are stored in a data structure (e.g., table). In one embodiment, such correlations are received from the technician as discussed above, which are populated in a data structure (e.g., table). In one embodiment, such a data structure is stored in database 105.

Upon storing such mappings or correlations in database 105 and installing a new hardware device 102 in data center 100, central server 101 is able to identify the computer cable used to connect the installed hardware device 102. Since the location of the computer cable is known, the location of the newly installed hardware device 102 is also known. A discussion regarding identifying such a computer cable upon installation of hardware device 102 is discussed below in connection with FIG. 7.

FIG. 7 is a flowchart of a method 700 for detecting a topology in a data center, such as data center 100, in accordance with an embodiment of the present disclosure.

Referring to FIG. 7, in conjunction with FIGS. 1-6, in operation 701, measurement engine 402 of central server 101 instructs measurement computing device 104 to transmit an input signal to endpoint device 205 attached to a connector portion of a computer cable (e.g., fiber connection 203) used to connect a newly installed hardware device 102 in data center 100.

As stated above, in one embodiment, such an input signal corresponds to the same input signal which was previously inputted to endpoint devices 205 prior to the installation of hardware device 102 by the technician discussed above. In one embodiment, such an input signal corresponds to a square wave signal.

In one embodiment, such an instruction is in a form of a computer program instructing measurement computing device 104 to transmit an input signal to endpoint device 205 as discussed above.

In one embodiment, such an instruction is in response to an installation of hardware device 102. In one embodiment, central server 101 receives an indication of the installation of hardware device 102 in data center 100 from the technician that installed hardware device 102 in data center 100. In one embodiment, such an indication is in the form of an electronic message.

Alternatively, in one embodiment, central server 101 utilizes a device discovery tool for detecting newly installed hardware, such as hardware device 102, in data center 100. Examples of such device discovery tools include, but not limited to, SolarWinds® Network Topology Mapper, ManageEngine® OpManager, Intermapper®, Atera®, NetBrain®, etc.

In operation 702, measurement engine 402 of central server 101 receives the measurement value of the output signal from endpoint device 205 based on the input signal.

As stated above, in one embodiment, such a measurement value, such as measurement value 307, is received by central server 101 from measurement computing device 102.

In operation 703, comparison engine 403 of central server 101 compares the received measurement value to the other measurement values stored in the data structure (e.g., table) which stores the correlations between the output measurement values of the output signals from endpoint devices 205 to the identifiers (e.g., serial numbers) of the connectors of the computer cables (e.g., fiber connections 203) upon which endpoint devices 205 are mechanically clipped.

As discussed above, in one embodiment, comparison engine 403 utilizes various software tools for comparing the received measurement value to the other measurement values stored in the data structure (e.g., table) which stores the correlations between the output measurement values of the output signals from endpoint devices 205 to the identifiers (e.g., serial numbers) of the connectors of the computer cables (e.g., fiber connections 203) upon which endpoint devices 205 are mechanically clipped, including, but not limited to, Enlighten Match, Senzing®, LinkageWiz, DataMatch, Egon, Data Ladder®, Matchit®, etc.

In operation 704, comparison engine 403 of central server 101 determines if a matching measurement value is found in the data structure.

If a matching measurement value is not found in the data structure, then, in operation 705, comparison engine 403 of central server 101 generates an indication that a matching measurement value was not found. In one embodiment, such an indication corresponds to an electronic message (e.g., email message, instant message), which may be sent to the user of central server 101.

If, however, a matching measurement value is found in the data structure, then, in operation 706, comparison engine 403 of central server 101 identifies the computer cable (e.g., fiber connection 203) that is used to connect the newly installed hardware device 102 based on the identifier (e.g., serial number) of the connector of the computer cable that is used to connect the newly installed hardware device 102 as discussed above. Furthermore, since the location of the computer cable is known, the location of the newly installed hardware device 102 is also known. In this manner, the particular computer cable (e.g., fiber connection 203) being utilized for connecting the newly installed hardware device 102 is identified, including the location of the newly installed hardware device 102.

In operation 707, upon identifying the computer cable (e.g., fiber connection 203) being utilized for connecting the newly installed hardware device 102, including the location of hardware device 102, topology engine 404 of central server 101 updates the topology accordingly.

As discussed above, a "topology," as used herein, refers to the physical and logical arrangement of computer cables (e.g., fiber connections 203) and hardware devices (e.g., hardware devices 102) in data center 100. In one embodiment, topology engine 404 utilizes various software tools for updating the topology including, but not limited to, SolarWinds® Network Topology Mapper, Paessler® PRTG® Network Monitor, ManageEngine® OpManager, Nmap®, etc.

As a result of the foregoing, embodiments of the present disclosure provide a means for automatically determining the topology of the data center when new hardware devices are installed in the data center without employing complex components (e.g., sensors) and algorithms.

Furthermore, the principles of the present disclosure improve the technology or technical field involving a data center. As discussed above, a data center may be a building, a dedicated space within a building, or a group of buildings used to house computer systems and associated components, such as telecommunications and storage systems. The core components of a data center may include routers, switches, firewalls, storage systems, servers and application delivery controllers. Together, they provide network infrastructure (connects servers (physical and virtualized), data center services, storage and external connectivity to end-user locations), storage infrastructure (used to hold data) and computing resources (provide the processing, memory, local storage and network connectivity that drive applications). Data centers are designed to support business applications and activities that include email, file sharing, productivity applications, customer relationship management (CRM), enterprise resource planning (ERP), databases, big data, artificial intelligence, machine learning, virtual desktops, communications, collaboration services, etc. Data center components require significant infrastructure to support the data center's hardware and software. These include power subsystems, uninterruptible power supplies (UPS), ventilation, cooling systems, fire suppression, backup generators, and connections to external networks. Typically, data centers include thousands of connections that change quickly over time with new hardware being installed in such data centers. Teams responsible for managing this hardware may have difficultly in keeping track of the topology in the data center, including the cables being used to connect such hardware. Current solutions in assisting such teams to keep track of the topology in the data center, including the cables being used to connect such hardware, have been very expensive at scale. For example, such solutions may employ complex components (e.g., sensors) and algorithms to keep track of the topology in the data center. As a result, there is not currently a means for effectively detecting a topology in the data center in a cost-effective manner.

Embodiments of the present disclosure improve such technology by instructing a measurement computing device to transmit an input signal (e.g., square wave signal) to an endpoint device mechanically clipped to a computer cable by a central server in a data center. An "endpoint device," as used herein, refers to a device that is attached to a connector portion of a computer cable and is in contact with a portion of a computer port of the hardware device (e.g., switch) when the connector is inserted into the computer port. Since each endpoint device has a different resistor-capacitor configuration which affects the input signal uniquely, each endpoint device outputs an output signal with a different measurement value. A "central server" of the data center, as used herein, is a server responsible for providing shared access to applications and data of the data center. A "measurement computing device" is a computing device configured to measure output signals from the connected endpoint devices. The measurement computing device provides the central server the measurement value of the output signal (e.g., output voltage signal) from the endpoint device based on the input signal. The central server then compares the measurement value of the output signal with other measurement values that were previously obtained by a technician when the technician measured the output signal from various endpoint devices based on the same input signal (e.g., square wave signal). The measurement values that were obtained by the technician are mapped or correlated to identifiers (e.g., serial numbers) of the connectors of the computer cables that are used to connect hardware devices in the data center. That is, such output measurement values from the endpoint devices are mapped or correlated to identifiers of the connectors of computer cables plugged into the hardware devices. As a result, upon the central server identifying a measurement value out of the measurement values obtained by the technician, the central server is able to identify the connector of the computer cable connected to the newly installed hardware device. Furthermore, since the location of the computer cable is known, the location of the newly installed hardware device is also known. The topology is then updated by the central server accordingly based on the identified computer cable. In this manner, the topology in a data center is detected without employing complex components (e.g., sensors) and algorithms. Furthermore, in this manner, there is an improvement in the technical field involving a data center.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for detecting a topology in a data center, the method comprising:
  instructing a measurement computing device to transmit an input signal to an endpoint device of a plurality of endpoint devices located in the data center, wherein the endpoint device is attached to a connector portion of a computer cable used to connect a newly installed hardware device in the data center;
  receiving a measurement value of an output signal from the endpoint device based on the input signal; and
  comparing the measurement value of the output signal from the endpoint device to other output measurement values of the plurality of endpoint devices to identify the computer cable connected to the newly installed hardware device in the data center.

2. The method as recited in claim 1 further comprising:
  identifying the computer cable connected to the newly installed hardware device in the data center based on identifying an identifier of a connector of the computer cable correlated with the measurement value of the output signal from the endpoint device; and
  updating the topology based on the identified computer cable.

3. The method as recited in claim 1, wherein each of the plurality of endpoint devices produces a different output signal from the input signal based on having a different resistor-capacitor configuration which affects the input signal uniquely.

4. The method as recited in claim 1 further comprising:
  receiving correlations between an output measurement value of an output signal from each endpoint device of the plurality of endpoint devices and an identifier of a connector of a computer cable of the plurality of computer cables; and
  storing the correlations between the output measurement values of the plurality of endpoint devices and the identifiers of the connectors of the plurality of computer cables.

5. The method as recited in claim 4, wherein each of the connectors of the plurality of computer cables is associated with a unique serial number, wherein the output measurement values of the plurality of endpoint devices are correlated to serial numbers of the connectors of the plurality of computer cables.

6. The method as recited in claim 1, wherein the endpoint device is connected to the measurement computing device via a connection strip.

7. The method as recited in claim 1, wherein the input signal comprises a square wave signal.

8. A computer program product for detecting a topology in a data center, the computer program product comprising one or more computer readable storage mediums having program code embodied therewith, the program code comprising programming instructions for:
  instructing a measurement computing device to transmit an input signal to an endpoint device of a plurality of endpoint devices located in the data center, wherein the endpoint device is attached to a connector portion of a computer cable used to connect a newly installed hardware device in the data center;
  receiving a measurement value of an output signal from the endpoint device based on the input signal; and
  comparing the measurement value of the output signal from the endpoint device to other output measurement values of the plurality of endpoint devices to identify the computer cable connected to the newly installed hardware device in the data center.

9. The computer program product as recited in claim 8, wherein the program code further comprises the programming instructions for:
  identifying the computer cable connected to the newly installed hardware device in the data center based on identifying an identifier of a connector of the computer cable correlated with the measurement value of the output signal from the endpoint device; and
  updating the topology based on the identified computer cable.

10. The computer program product as recited in claim 8, wherein each of the plurality of endpoint devices produces a different output signal from the input signal based on having a different resistor-capacitor configuration which affects the input signal uniquely.

11. The computer program product as recited in claim 8, wherein the program code further comprises the programming instructions for:

receiving correlations between an output measurement value of an output signal from each endpoint device of the plurality of endpoint devices and an identifier of a connector of a computer cable of the plurality of computer cables; and storing the correlations between the output measurement values of the plurality of endpoint devices and the identifiers of the connectors of the plurality of computer cables.

12. The computer program product as recited in claim 11, wherein each of the connectors of the plurality of computer cables is associated with a unique serial number, wherein the output measurement values of the plurality of endpoint devices are correlated to serial numbers of the connectors of the plurality of computer cables.

13. The computer program product as recited in claim 8, wherein the endpoint device is connected to the measurement computing device via a connection strip.

14. The computer program product as recited in claim 8, wherein the input signal comprises a square wave signal.

15. A system, comprising:

a memory for storing a computer program for detecting a topology in a data center; and a processor connected to the memory, wherein the processor is configured to execute program instructions of the computer program comprising:

instructing a measurement computing device to transmit an input signal to an endpoint device of a plurality of endpoint devices located in the data center, wherein the endpoint device is attached to a connector portion of a computer cable used to connect a newly installed hardware device in the data center;

receiving a measurement value of an output signal from the endpoint device based on the input signal; and comparing the measurement value of the output signal from the endpoint device to other output measurement values of the plurality of endpoint devices to identify the computer cable connected to the newly installed hardware device in the data center.

16. The system as recited in claim 15, wherein the program instructions of the computer program further comprise:

identifying the computer cable connected to the newly installed hardware device in the data center based on identifying an identifier of a connector of the computer cable correlated with the measurement value of the output signal from the endpoint device; and updating the topology based on the identified computer cable.

17. The system as recited in claim 15, wherein each of the plurality of endpoint devices produces a different output signal from the input signal based on having a different resistor-capacitor configuration which affects the input signal uniquely.

18. The system as recited in claim 15, wherein the program instructions of the computer program further comprise:

receiving correlations between an output measurement value of an output signal from each endpoint device of the plurality of endpoint devices and an identifier of a connector of a computer cable of the plurality of computer cables; and storing the correlations between the output measurement values of the plurality of endpoint devices and the identifiers of the connectors of the plurality of computer cables.

19. The system as recited in claim 18, wherein each of the connectors of the plurality of computer cables is associated with a unique serial number, wherein the output measurement values of the plurality of endpoint devices are correlated to serial numbers of the connectors of the plurality of computer cables.

20. The system as recited in claim 15, wherein the endpoint device is connected to the measurement computing device via a connection strip.

\* \* \* \* \*